(12) United States Patent
Staudemann et al.

(10) Patent No.: US 7,936,099 B2
(45) Date of Patent: May 3, 2011

(54) ELECTRIC MOTOR STATOR

(75) Inventors: Christian Staudemann, Mamishaus/Bern (CH); Christoph Battisti, Bludenz (AT); Lukas Battisti, legal representative, Bludenz (AT); Marion Battisti, legal representative, Bludenz (AT)

(73) Assignee: Thyssenkrupp Presta AG, Eschen (LI)

( * ) Notice: Subject to any disclaimer, the term of this patent is extended or adjusted under 35 U.S.C. 154(b) by 357 days.

(21) Appl. No.: 11/996,775

(22) PCT Filed: May 30, 2006

(86) PCT No.: PCT/CH2006/000286
§ 371 (c)(1),
(2), (4) Date: Jan. 25, 2008

(87) PCT Pub. No.: WO2007/012207
PCT Pub. Date: Feb. 1, 2007

(65) Prior Publication Data
US 2008/0231133 A1 Sep. 25, 2008

(30) Foreign Application Priority Data
Jul. 28, 2005 (CH) ...................................... 1265/05

(51) Int. Cl.
*H02K 11/00* (2006.01)
(52) U.S. Cl. ........... 310/71; 310/208; 310/180; 310/198
(58) Field of Classification Search ..................... 310/71, 310/208, 185, 180, 184, 198
See application file for complete search history.

(56) References Cited

U.S. PATENT DOCUMENTS

| | | | | |
|---|---|---|---|---|
| 4,287,446 A | * | 9/1981 | Lill et al. | 310/71 |
| 4,451,751 A | * | 5/1984 | Auinger | 310/184 |
| 5,970,600 A | * | 10/1999 | Huang et al. | 29/596 |
| 2002/0096959 A1 * | | 7/2002 | Qin et al. | 310/208 |
| 2003/0188490 A1 * | | 10/2003 | Kraus et al. | 49/348 |
| 2004/0007935 A1 * | | 1/2004 | Kimura et al. | 310/254 |
| 2004/0027078 A1 * | | 2/2004 | Xu et al. | 318/107 |
| 2004/0183388 A1 * | | 9/2004 | Rittmeyer | 310/179 |
| 2004/0256936 A1 * | | 12/2004 | Takahashi et al. | 310/91 |
| 2005/0012421 A1 * | | 1/2005 | Fukuda et al. | 310/179 |
| 2005/0023910 A1 * | | 2/2005 | Lukenich | 310/71 |

FOREIGN PATENT DOCUMENTS

| | | | |
|---|---|---|---|
| EP | 1306960 A2 | * | 5/2003 |
| EP | 1499003 A1 | * | 1/2005 |
| WO | WO 2005036724 A1 | * | 4/2005 |

* cited by examiner

*Primary Examiner* — Quyen Leung
*Assistant Examiner* — Alex W Mok
(74) *Attorney, Agent, or Firm* — Notaro, Michalos & Zaccaria P.C.

(57) ABSTRACT

The invention relates to a stator for an electronically switchable electric motor comprising a cylinder-shaped envelop and several poles, which are made of an ferromagnetic material and inwardly oriented in front of the cylinder axis (3), wherein said poles (P1 to P12) surround a cylindrical cavity for receiving the rotor (2), each pole (P1 to P12) is provided with a coil (L1 to L12) consisting of several wire windings in such a way that a magnetic armature is formed and the windings of coils (L1 to L12) are wound about the poles (P1 to P12) successively and without interruptions.

15 Claims, 5 Drawing Sheets

Figure 1:
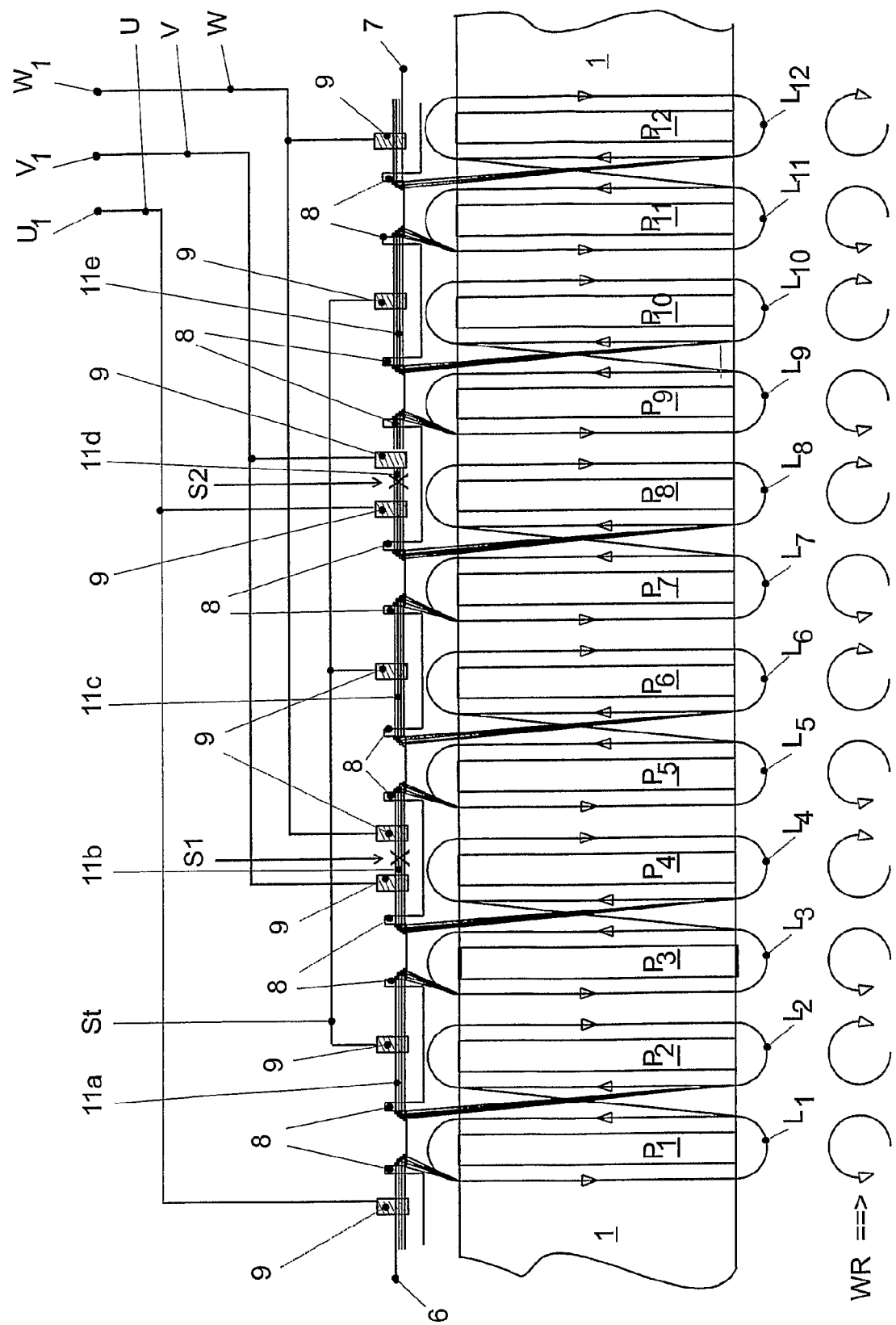

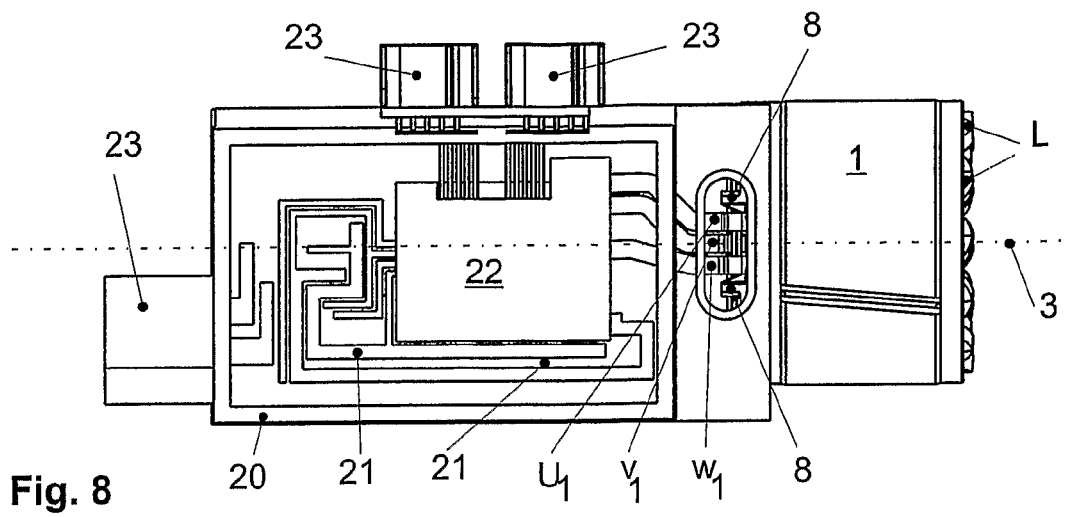
Fig. 8
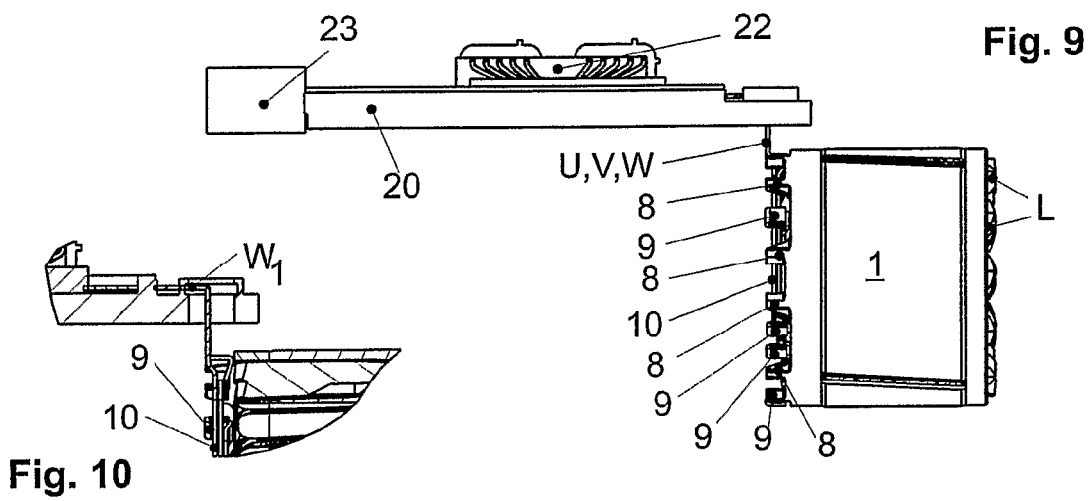
Fig. 9
Fig. 10
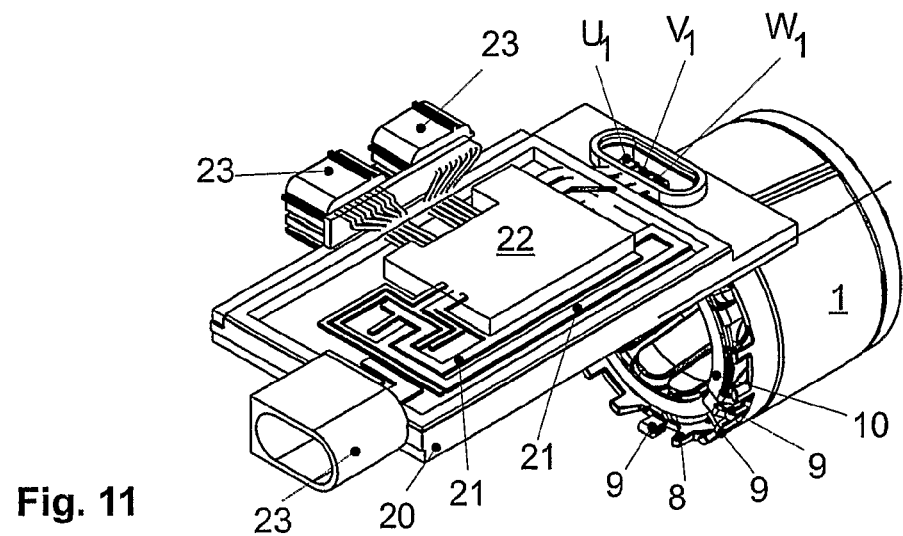
Fig. 11

ELECTRIC MOTOR STATOR

The invention relates to a stator for an electronically commutated electric motor.

The subject matter of the invention relates to the production of armature windings for an electronically commutated electric motor, which makes it possible to realize a method of construction for high efficiency and economy.

In power steering mechanisms for automobiles especially high demands are placed, in particular, on the motor drives. Due to the required highly compact structural form and high-demanded drive ratings, correspondingly high efficiencies are needed in electric motors. In addition, with such mass produced items in the automobile industry, the production costs must be correspondingly low, which requires high economy in the production of such a drive. Electronically commutated electric motors are therefore increasingly utilized for such drives, such as is described, for example, in EP 1 499 003 A1. The multi-phase stator windings disclosed in this document are successively wound per phase onto the poles and its wires are connected to a three-phase system outside of the stator after the winding of each phase disposition. The deposition of the windings on such compact stators is highly complex and, in particular, the connecting of several wires outside of the stator leads to additional expenditures, making the disposition less economic.

The present invention addresses the problem of eliminating the disadvantages of prior art. The problem in particular comprises realizing a stator for an electronically commutated electric motor with armature windings on the stator poles, which is of extremely compact structure and permits high efficiency with low leakage loss of the stator field at high economy of production.

The problem is solved according to the invention thereby that the stator for an electronically commutated electric motor comprises a cylindrical shell and several poles of ferromagnetic material directed inwardly toward the cylinder axis, the poles encompassing a cylindrical cavity for housing a rotor and each pole being provided with a winding with several wire turns for building up a magnetic armature is implemented such that the turns of the windings are disposed wound without interruption successively about the poles.

The turns are wound individually, successively and without interruption about the poles of the stator, wherewith no cycle time loss occurs due to the disconnecting of the wire and holding the open wire ends. To keep leakage losses and stray capacitances low, the winding bundles in electronically commutated motors are advantageously formed of several single wire strands, for example by bifilar winding of several wires onto each pole, however, in particular and preferably, by interlacing several turns on each pole and subsequently parallel connecting. On each pole is hereby generated a bundle of several parallel connected wire windings which form a winding bundle at each pole.

Wherever terminals are provided, the wires are preferably all led out at the engagement side at the transition from one pole winding to the other pole winding, at an engagement side of the stator cylinder, from the pole region, such that here a loop-form wire transition is formed, at which the application of electrical contacts can take place. The wire loop of the wire bundle thus formed is, consequently, kept very short and low losses are thereby generated with accessibility, which, nevertheless, is favorable for the production of the electrical contacts of the terminals.

Said wire transitions can, for example, be readily disconnected at two positions, and specifically the entire wire bundle in one working step, in order to generate correspondingly necessary winding configurations together with the winding start and the winding end for a multi-phase, in particular for a three-phase, system. By sliding on contact rings at the engagement side, which have contact points, for example hooks, which are disposed on annular conductors, the wire transitions and the winding start and the winding end can be provided with electrical contacts in simple manner, for example by welding, shrink-crimping or preferably by soldering. It becomes hereby possible to realize the application of electrical contacts simply with a modularly structured contact ring on the engagement side of the stator. The windings are herein joined to a three-phase system with the three electrical phase terminals for the in-feeding of the three electronically processed control signals for the motor.

Placing the windings on all of the poles, consequently, takes place successively in one pass without interruption of the winding process, as would be necessary according to prior art for disconnecting and assigning of windings. The assigning of the individual windings to the phases is carried out in simple manner after the winding process has been completed solely by disconnecting and/or applying electrical contacts on wire loops led out at the engagement side. The connections to be established can herein be completed cost-effectively with a contact ring. It becomes therewith readily possible to select the sequence of the winding placement of the poles of the stator in such a manner as is optimal for an automatic winding installation without having to take into consideration the manner in which the poles are later to be assigned to the phases.

Said arrangement now permits additionally to dispose the electronic control circuitry together with the electronic power circuitry on a circuit board which is directly connected as componentry to the contact ring and thereby to the stator and its stator windings. This componentry permits the extremely economic production for operating an electronically commutated electric motor with high efficiency. The modular construction of the structure additionally permits simple handling and assembly. The arrangement is hereby especially suitable for the application in power steering mechanisms operated by electric motor for motor automotive vehicles.

Figure 2:
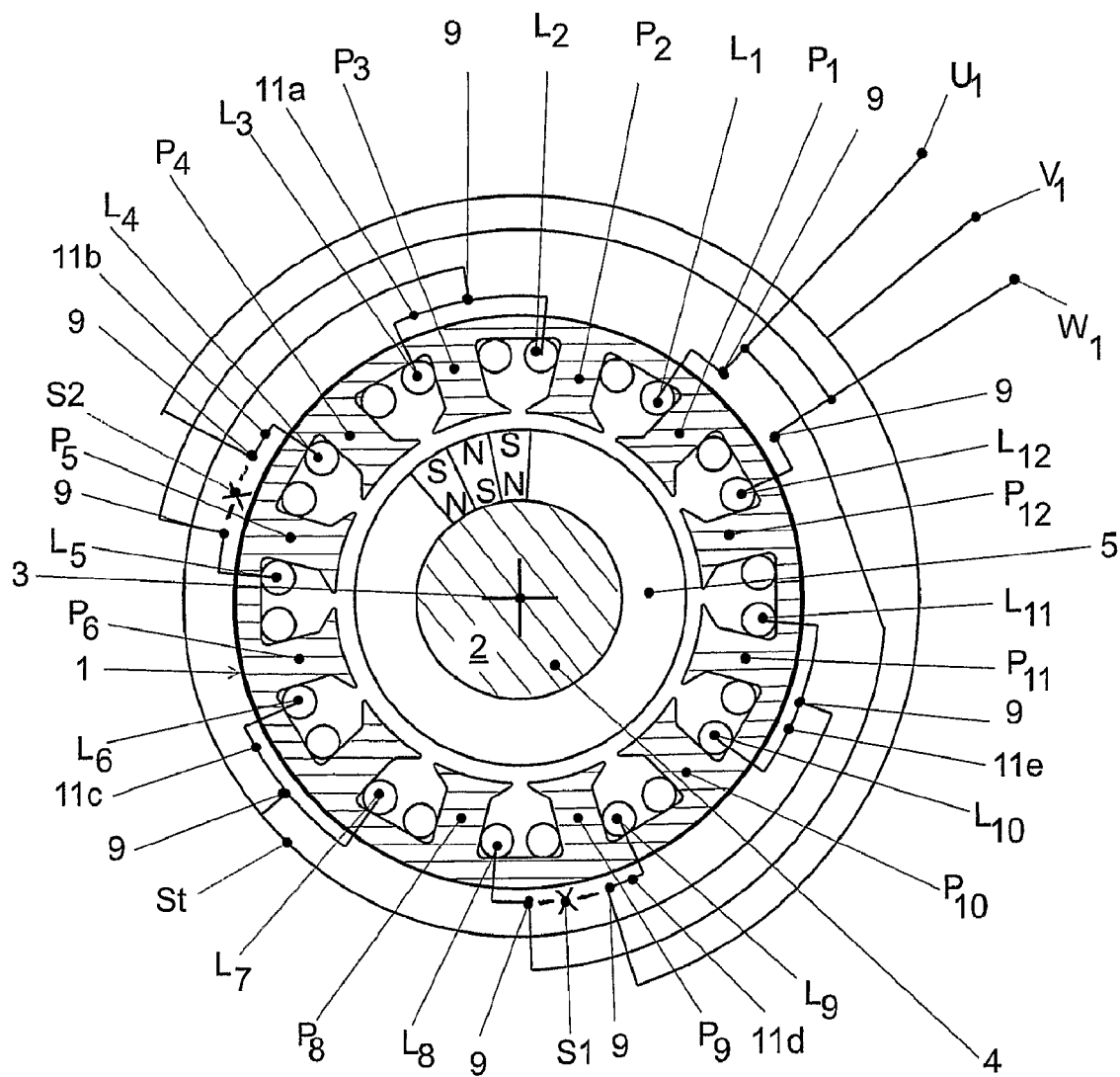

In the following the invention will be described in further detail by example and in conjunction with schematic Figures. In the drawing depict:

FIG. 1 schematically a winding diagram for a development according to the invention of a 12-pole stator with its terminals and fourfold interlaced wire windings. The shell of the cylindrical stator is shown in wound out form, FIG. 2 schematically and in cross section an electronically commutated motor with rotor and stator according to FIG. 1, FIG. 3 in three-dimensional representation a stator according to FIG. 1 and FIG. 2, FIG. 4 a contact ring with contact hooks, fitting onto the arrangement according to FIG. 3, FIG. 5 an assembled arrangement of stator according to FIG. 3 with contact ring according to FIG. 4, FIG. 6 a stator according to FIG. 3 with the windings in three-dimensional view onto the cylinder engagement side with wire bridges not led to the outside, FIG. 7 in three-dimensional view parts of a componentry with stator in combination with contact ring and circuit board structure with electronic control and power circuitry in exploded representation, FIG. 8 the assembled componentry according to FIG. 7 in top view onto the circuit board and the stator, FIG. 9 a side view of the componentry according to FIG. 8, FIG. 10 a cross section of the componentry according to FIG. 9 in the region of the terminal transition between contact ring and circuit board, FIG. 11 the componentry according to FIGS. 8 to 10 in perspective view.

An electronically commutated electric motor is substantially comprised of a stator 1, developed cylindrically, and which, in the example, has the poles P1 to P12 directed toward the interior of the cylinder and toward its central axis 3, the poles P1 to P12 carrying windings L1 to L12 and in this manner are developed as armature winding, wherein in the center of the cavity of the stator cylinder a rotor 2 is disposed such that it is able to rotate freely about the cylinder axis 3 as shaft 4 and which [rotor] comprises permanent magnets aligned counter to the poles P1 to P12. The cylindrical stator 1 includes a shell 1a of ferromagnetic material with inwardly directed poles P1 to P12, also of ferromagnetic material, thereon which receive the windings L1 to L12. For convenience, the poles P1 and P12 are collectively referred to by the letter P in FIGS. 2, 6 and 7 of the drawings. Also, for convenience, the windings L1 to L12 are collectively referred to by the letter L in FIGS. 3 and 6-9 of the drawings.

As a rule, windings L1 to L12 are electrically connected or switched or wired with one another such that the windings form a multi-phase system, in particular a three-phase system, for the generation of a rotary field generated through electronic in-feeding into the windings via the winding terminals U1, V1, W1 and via the connection lines U, V, W to the windings. This rotary field subsequently sets the rotor, with the permanent magnets 5 disposed thereon, into rotating movement. As is shown in conjunction with an example with 12 poles P1 to P12 in FIG. 2 in cross section and in FIG. 1 in a winding diagram with rolled out cylinder shell, according to the invention the poles are now wound successively in a single pass. For example, at winding start 6 the wire for the winding L1 is secured about the pole 1 and wound with several turns about pole 1 and subsequently guided onto pole 2, where, again, several turns are deposited according to the winding direction WR. After completing winding L2 about pole P2, the wire is led out at the engagement side at stator 1 in a short loop from the pole region away and out of it and subsequently again back to pole 3, where winding L3 is deposited and subsequently winding L4 about pole P4, wherein, after completing this winding L4, the wire is again led out at the engagement side in a loop and again back for the next winding L5 about pole P5, etc. The wire loops led out form consequently wire transitions 11a to 11e from one pole winding to the next pole winding. Such wire transitions 11a to 11e are led out where contact sites 9 are required in order to wire, on the one hand, a three-phase winding system and, on the other hand, to establish the power supply systems. The wire transitions 11a to 11e are advantageously located at the one engagement side of the cylindrical stator 1 and carried and positioned via insulating supports 8. For convenience, the wire transitions 11a to 11e are collectively referred to by the number 11 in FIGS. 3 and 5 of the drawings.

In the present example according to FIG. 1, four wires are shown wound successively and, consequently, form each the winding bundles L1 to L12. Thereby that these wires are wound in a single pass solely one winding start 6 and one winding end 7, where the wires need to be secured in place, result in the winding process. Through electrical contacts of the corresponding wire transitions and through disconnecting S1, S2 of wire transitions, windings are subsequently wired such that a three-phase system is established via the connection lines U, V, W to contacts 9 and the windings L1 to L12 with the three-phase terminal U1, V1, W1. The present arrangement can be realized highly economically and permits low-leakage winding arrangements, which ensure high efficiency of the motor. The approach according to the invention is especially suitable for compact motor arrangements in which the conditions for the winding are highly restricted and especially if several wires must be wound interlaced or bifilarly, respectively parallel, for each pole. The approach according to the invention is suitable especially for interlaced multiwire windings which include for each pole several interlaced wire bundles. As shown in the example according to FIG. 3, for a fourfold interlaced, parallel connected winding, each wire is wound individually successively without interruption over the poles and led out and guided back again at the requisite sites on the engagement side of the stator cylinder for applying electrical contacts and/or the cut S1, S2. The individual wires, here four, are lastly connected parallel for each winding, however are disposed in interlaced form within the individual winding L1 to L12. The interlaced disposition has special advantages with respect to low stray capacitances and stray inductances, which increases the efficiency of the motor and improves the activatability of the motor. However, at lower requirements the windings can also be directly developed parallel, thus, bifilarly.

Figure 3:
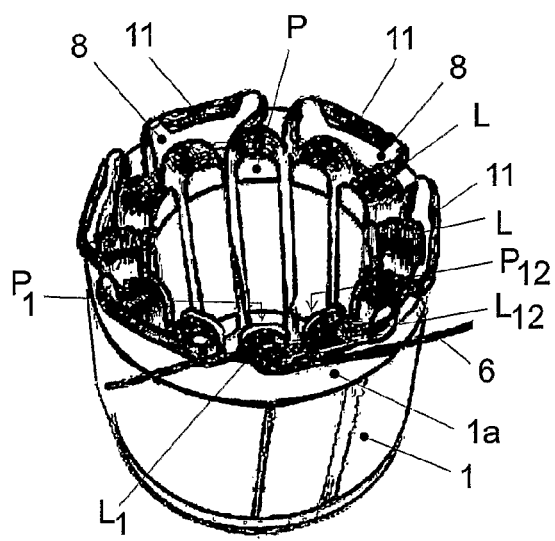
Figure 4:
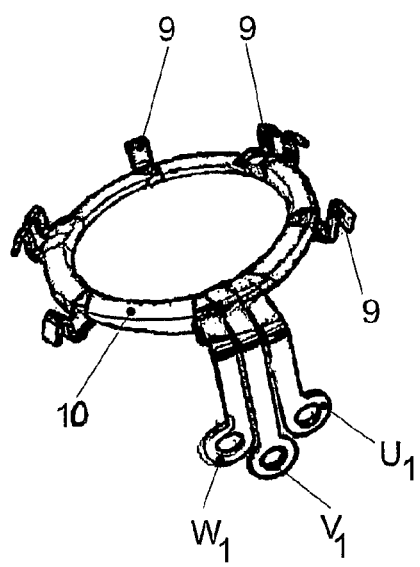
Figure 5:
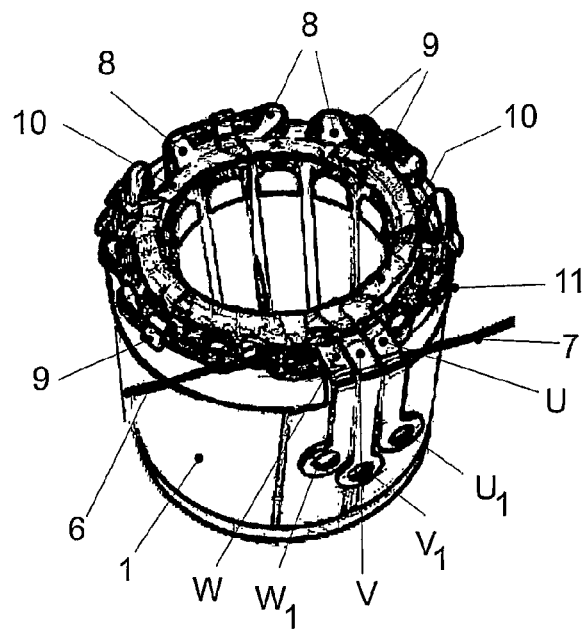

An example of a preferred embodiment of a stator 1 with windings L1 to L12 disposed thereon is depicted in FIG. 3 in three-dimensional representation with view onto the engagement side of the cylindrical stator 1. The first winding L1 is deposited at a first pole P1 at which is also located the winding start 6 at the engagement side with respect to the cylindrical stator 1. Windings L1 to L12 are subsequently without interruption sequentially deposited onto poles P1 to P12 and then, at the last pole P12, which is adjacent to the first pole, again led out as winding end 7. Short wire loops forming wire transitions 11a to 11e are led out from the windings at the engagement side and guided back again in order to realize at the desired sites the electrical contact sites 9 and/or the cutting sites S1, S2 for the disconnection of the winding bundles. A contact ring 10 formed of preferably flat conductor paths U, V, W with terminals U1, V1, W1, which comprises contacts 9, preferably implemented as hooks, guided out of the ring, is shown in FIG. 4 in three-dimensional representation. For applying the electrical contacts 9 forming the winding terminals and for forming the winding feeds, this contact ring 10 is placed at the engagement side to the stator 1 via the wire transitions 11a to 11e, such that the contacts 9 with the hooks are in contact on the desired wire transitions 11a to 11e, as is shown in FIG. 5. The contacts, such as for example the hooks, are subsequently electrically connected, such as welded, however, preferably soldered, with the wire transition bundles.

The wire transitions 11a to 11e are preferably guided via supports 8, disposed on the engagement side with respect to the rotor 1, of insulating material, such that a compact and stable arrangement is possible.

Figure 6:
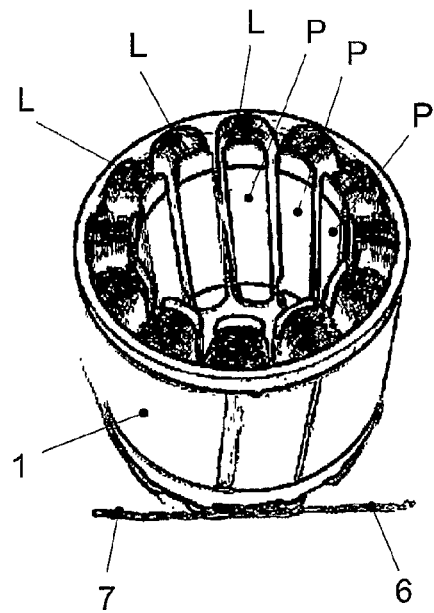

In the present and preferred example the contact ring 10 is disposed on one side of the cylindrical stator 1, as is evident in FIGS. 3 to 6. FIG. 6 shows the second engagement side of the cylindrical stator 1 in three-dimensional view, which faces away from the first engagement side with the contact ring 10 disposed thereon. In this preferred embodiment all terminals are implemented on one engagement side of the cylindrical stator 1 and guided to terminals U1, V1, W1.

Figure 7:
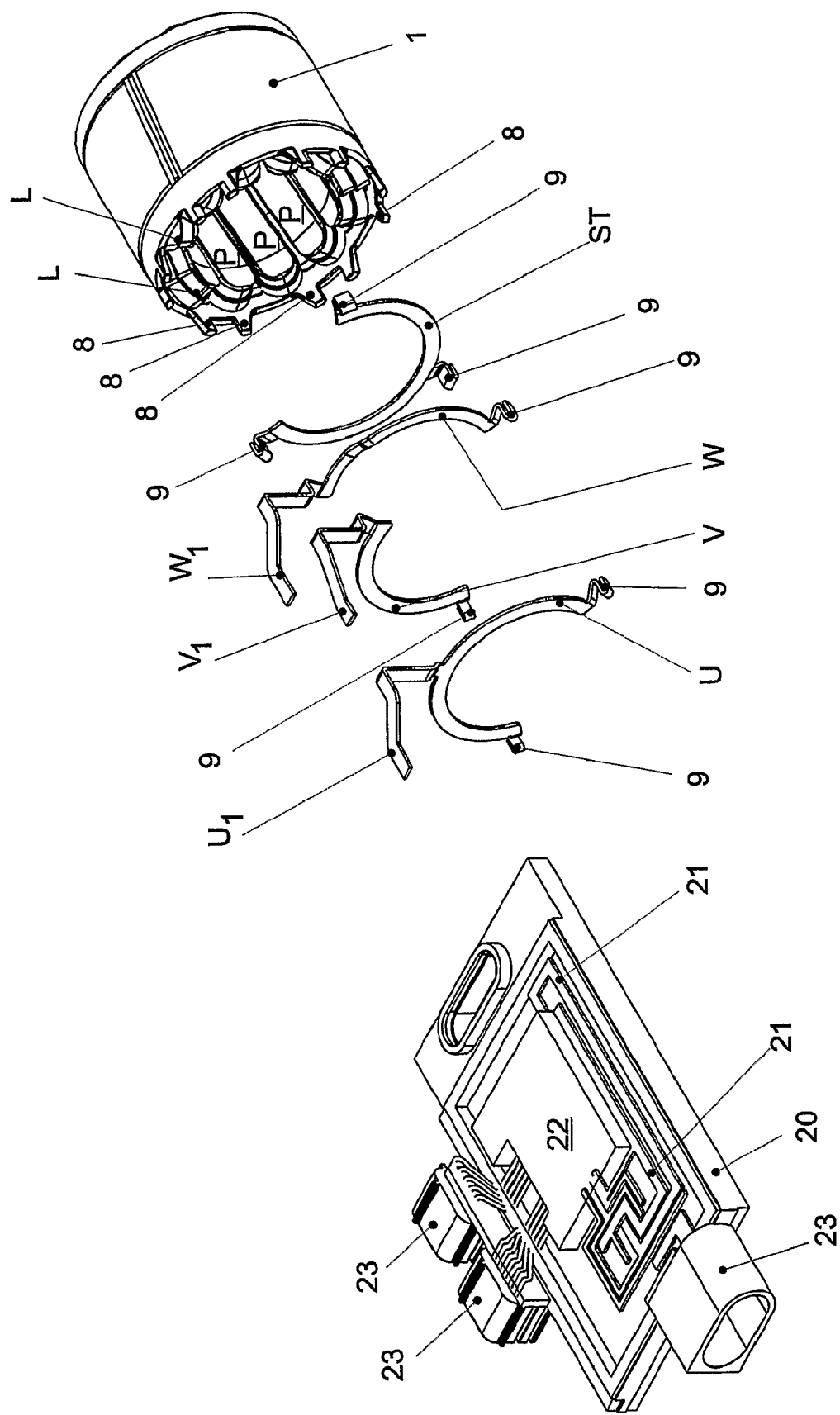

The implementation according to the invention of stator 1 with the windings L1 to L12 formed thereon and the contact ring 10 permit an extremely compact structuring which is simple to produce and, consequently, well adapted to industrial production. In this way, the stator windings L1 to L12 can be connected through the appropriate sequence of winding without special expenditures in any desired sequence as preferred. For the wires necessary for establishing such windings, as before, lacquered copper wires can be utilized and the conductor paths on contact ring 10 can also, for example, be extrusion-coated with synthetic material for the mutual insulation and yet be connected simply by sliding on and soldering, welding or also shrink-crimping at the desired sites. This compact and modular building-up of stator 1 with the contact ring 10, permits further (for [sic]) to connect the electronically commutated electronic control and power circuitry 22 directly modularly with the stator 1 whereby, additionally, problematic cable connections and plug connections can be avoided, which, on the one hand, increases the operational reliability and, on the other hand, makes possible the economic realization, as is shown in FIG. 7 in three-dimensional representation.

A circuit board 20, which bears punched or etched conductor paths 21 for carrying current, as well as electronic circuitry 22 disposed thereon with the terminal sites 23 leading to the outside, which are preferably implemented as plug connections, can be disposed directly on the contact ring 10. As depicted in FIGS. 7 to 11, hereby a highly compact and modular arrangement is generated. The control device, formed of the circuit board 20 with the wiring paths 21 of the electronic circuitry 22 and the interface terminals 23 is connected directly with the contact ring 10 of stator 1 via a contact part. The circuit board 20 can be implemented as a synthetic material part bearing the contacts and wire connections and does not absolutely need to be in the shape of a plate. The wire connections 21 on the synthetic material part, such as for example of circuit board 20, are preferably implemented as a punched grid and the contacts of the contact ring and the contact ring parts are preferably also punched parts, which are preferably component parts of the control device of the punched grid. Through this approach long line paths can be avoided and the number of interfaces or critical connection elements can be kept low.

The various features of novelty which characterize the invention are pointed out with particularity in the claims annexed to and forming a part of this disclosure and are entirely based on the priority application no.: CH20050001265 filed Jul. 28, 2005.

The invention claimed is:

1. Stator for an electronically commutated electric motor, comprising:
 a cylindrical shell having an engagement side and an opposite side, with a plurality of poles (P1 to P12) of ferromagnetic material extending inwardly toward the cylinder axis (3) of the shell,
 the poles (P1 to P12) being spaced from each other in sequence around the shell and together encompassing a cylindrical cavity for housing a rotor (2) and wherein each pole (P1 to P12) is provided with a winding (L1 to L12) of a plurality of wire turns for developing a magnetic armature,
 the wire turns of the windings (L1 to L12) being wound from only one start (6) to only one end (7) around the shell, without interruption, in a single pass, successively and in sequence from pole to pole around the shell and about the poles (P1 to P12) to form each winding around each respective pole,
 a wire loop extending between each pair of adjacent poles around the shell and only at the engagement side of the shell, each wire loop forming a wire transition (11a to 11e) fixed at the engagement side of the shell,
 a plurality of the wire transitions (11) being cut to form an electrical disconnection (S) and create two contact areas for the windings of the adjacent poles at the engagement end of the shell, and
 a contact ring (10) having a plurality of stacked and mutually insulated flat conductor paths (U, V, W) of electrically conductive material, each conductor path extending partly around the engagement end of the shell, each conductor path having opposite ends with an electrical contact (9) at each end of each conductor path, each contact (9) being engaged with a respective wire transitions (11) or contact area of a wire transition (11) for wiring the windings at only the engagement side of the stator.

2. Stator as claimed in claim 1, wherein each pole (P1 to P12) receives at least two windings (L1 to L12) wound in the same direction and these windings form for one pole (P1 to P12) in each instance a winding bundle (L1 to L12).

3. Stator as claimed in claim 2, wherein the turns of the windings (L1 to L12) for each pole (P1 to P12) are developed as a bifilar winding.

4. Stator as claimed in claim 2, wherein the turns of the windings (L1 to L12) for each pole (P1 to P12) are developed as an interlaced winding.

5. Stator as claimed in claim 1, wherein the wire transitions (11a to 11e) are guided via insulating supports (8) disposed on the engagement side of the shell.

6. Stator as claimed in claim 1, wherein the electrical contacts (9) for an electrical power supply system takes place at the engagement side on the stator (1) on the winding start (6), on the winding end (7) and on at least one of the wire transitions (11a to 11e).

7. Stator as claimed in claim 6, wherein taps of the electrical contacts (9) form a multi-phase winding arrangement in Y-connection configuration.

8. Stator as claimed in claim 7, wherein three wire transitions (11a to 11e) are electrically contacted and joined together with a Y-point line (ST) to form a Y-point (ST).

9. Stator as claimed in claim 6, wherein each electrical contact (9) is a welding connection or a solder connection.

10. Stator as claimed in claim 1, wherein the stacked flat conductor paths each have winding terminals (U1, V1, W1) connected directly to a circuit board (20), which includes electronic activation circuitry (22) with wiring paths (21) as well as electrical terminals (23).

11. Componentry comprised of a stator (1) as claimed claim 1, assembled with a circuit board (20), which includes electronic activation circuitry (22) with wiring paths (21) and electrical terminals (23).

12. Stator as claimed in claim 1, for an electronically commutated electric motor for activating a power steering mechanism in motor automotive vehicles.

13. Stator as claimed in claim 1 wherein the contacts (9) are in the shape of hooks.

14. Method for assembling a stator for an electronically commutated electric motor, with a cylindrical shell having an engagement side and an opposite side, with a plurality of poles (P1 to P12) of ferromagnetic material extending inwardly toward the cylinder axis (3) of the shell, the poles (P1 to P12) being spaced from each other in sequence around the shell and together encompassing a cylindrical cavity for housing a rotor (2) and wherein each pole (P1 to P12) is provided with a winding (L1 to L12) with several wire turns for developing a magnetic armature, the method comprising:
 winding turns of the windings (L1 to L12) without interruption successively about the poles (P1 to P12) from only one start (6) to only one end (7) around the shell, in a single pass and in sequence from pole to pole around the shell and about the poles (P1 to P12) to form each winding around each respective pole; forming a wire loop extending between each pair of adjacent poles around the shell and only at the engagement side of the shell, each wire loop forming a wire transition (11a to 11e) fixed at the engagement side of the shell;

cutting a plurality of the wire transitions (11) to form an electrical disconnection (S) to create two contact areas for the windings of the adjacent poles at the engagement end of the shell;

engaging an electrically conductive contact ring (10) having a plurality of stacked mutually insulated flat conductor paths (U, V, W) each made of conductive material and each extending partly around the engagement end of the shell, each conductor path have opposite ends with an electrical contact (9) at each end of each conductor path; and engaging the contacts (9) with respective wire transitions (11) or contact areas of the wire transitions (11) for wiring the windings at only the engagement side of the stator.

15. Method as claimed in claim 14 wherein the contacts (9) are in the shape of hooks.

* * * * *

UNITED STATES PATENT AND TRADEMARK OFFICE
CERTIFICATE OF CORRECTION

PATENT NO. : 7,936,099 B2  
APPLICATION NO. : 11/996775  
DATED : May 3, 2011  
INVENTOR(S) : Christian Staudenmann et al.

Page 1 of 1

It is certified that error appears in the above-identified patent and that said Letters Patent is hereby corrected as shown below:

On the Title page, correct field (75) to read as follows:

(75) Inventors: Christian Staudenmann, Mamishaus/Bern (CH);  
Christoph Battisti, Bludenz (AT);  
Lukas Battisti, legal representative, Bludenz (AT);  
Marion Battisti, legal representative, Bludenz (AT)

Signed and Sealed this  
Thirty-first Day of May, 2011

David J. Kappos  
*Director of the United States Patent and Trademark Office*